(12) United States Patent
Auyeung et al.

(10) Patent No.: US 10,390,024 B2
(45) Date of Patent: Aug. 20, 2019

(54) REGION OF INTEREST SCALABILITY WITH SHVC (71) Applicants: SONY CORPORATION, Tokyo (JP); Cheung Auyeung, Sunnyvale, CA (US); Jun Xu, Cupertino, CA (US); Ohji Nakagami, Tokyo (JP); Ali Tabatabai, Cupertino, CA (US)

(72) Inventors: Cheung Auyeung, Sunnyvale, CA (US); Jun Xu, Cupertino, CA (US); Ohji Nakagami, Tokyo (JP); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/760,457

(22) PCT Filed: Apr. 8, 2014

(86) PCT No.: PCT/US2014/033375
§ 371 (c)(1),
(2) Date: Jul. 10, 2015

(87) PCT Pub. No.: WO2014/168972
PCT Pub. Date: Oct. 16, 2014

(65) Prior Publication Data
US 2015/0350659 A1 Dec. 3, 2015

Related U.S. Application Data (60) Provisional application No. 61/809,747, filed on Apr. 8, 2013, provisional application No. 61/846,558, filed on Jul. 15, 2013.

(51) Int. Cl.
H04B 1/66 (2006.01)
H04N 7/12 (2006.01)
(Continued)

(52) U.S. Cl.
CPC ......... *H04N 19/167* (2014.11); *H04N 19/115* (2014.11); *H04N 19/174* (2014.11);
(Continued)

(58) Field of Classification Search
CPC .......................... H04N 19/36; H04N 19/187
See application file for complete search history.

(56) References Cited

U.S. PATENT DOCUMENTS 8,994,792 B2 * 3/2015 Chen .................. H04N 13/0066
348/46
9,794,649 B2 * 10/2017 Denoual ............ H04N 21/8456
(Continued)

FOREIGN PATENT DOCUMENTS

CN 101283599 A 10/2008
CN 101313578 A 11/2008
(Continued)

OTHER PUBLICATIONS

Bross et al. High Efficiency Video Coding (HEVC) text specification draft 10 (for FDIS & Consent) JCTVC-L1003, Jan. 2013.*
(Continued)

Primary Examiner — Tat C Chio
Assistant Examiner — Fabio S Lima
(74) Attorney, Agent, or Firm — Chip Law Group

(57) ABSTRACT

Region of Interest (ROI) scalability with SHVC is able to be implemented where scalability is used for part of a picture but not the whole picture. Applications of ROI scalability include traffic monitoring, security monitoring and tiled streaming.

18 Claims, 4 Drawing Sheets

Would like to get more detail in ROI in BL.

By providing more detail of ROI in EL.

Would like to get higher quality in ROI in BL.

By providing higher PSNR in ROI in EL.

(51) Int. Cl.

| | | |
|---|---|---|
| *H04N 11/02* | (2006.01) | |
| *H04N 11/04* | (2006.01) | |
| *H04N 19/167* | (2014.01) | |
| *H04N 19/187* | (2014.01) | |
| *H04N 19/36* | (2014.01) | |
| *H04N 19/70* | (2014.01) | |
| *H04N 19/115* | (2014.01) | |
| *H04N 19/463* | (2014.01) | |
| *H04N 19/174* | (2014.01) | |
| *H04N 19/33* | (2014.01) | |

(52) U.S. Cl.
CPC ........... *H04N 19/187* (2014.11); *H04N 19/33* (2014.11); *H04N 19/36* (2014.11); *H04N 19/463* (2014.11); *H04N 19/70* (2014.11)

(56) References Cited

U.S. PATENT DOCUMENTS

| | | | |
|---|---|---|---|
| 2008/0043095 A1 | 2/2008 | Vetro et al. | |
| 2008/0129844 A1* | 6/2008 | Cusack | H04N 5/232 348/241 |
| 2008/0225116 A1* | 9/2008 | Kang | H04N 21/235 348/135 |
| 2009/0222855 A1* | 9/2009 | Vare | H04L 12/189 725/39 |
| 2010/0158135 A1* | 6/2010 | Yin | H04N 19/70 375/240.26 |
| 2011/0002383 A1* | 1/2011 | Yoshida | H04N 19/70 375/240.12 |
| 2011/0096990 A1* | 4/2011 | Lu | H04N 19/103 382/173 |
| 2011/0267426 A1* | 11/2011 | Suh | H04N 13/0048 348/43 |
| 2012/0106622 A1* | 5/2012 | Huang | H04N 19/129 375/240.01 |
| 2012/0177121 A1* | 7/2012 | Tripathi | G06T 7/0079 375/240.16 |
| 2012/0201306 A1* | 8/2012 | Kang | H04N 19/00424 375/240.16 |
| 2013/0063577 A1* | 3/2013 | Jun | G02B 27/2264 348/53 |
| 2013/0322524 A1* | 12/2013 | Jang | H04N 19/30 375/240.03 |
| 2014/0082054 A1* | 3/2014 | Denoual | H04N 19/25 709/203 |
| 2014/0269317 A1* | 9/2014 | Wang | H04L 69/04 370/235 |
| 2015/0023407 A1* | 1/2015 | Sato | H04N 19/44 375/240.02 |
| 2015/0201202 A1* | 7/2015 | Hattori | H04N 19/70 375/240.02 |
| 2016/0286241 A1* | 9/2016 | Ridge | H04N 19/186 |

FOREIGN PATENT DOCUMENTS

| | | | |
|---|---|---|---|
| EP | 1681875 A | 7/2006 | |
| EP | 1681875 A1 | 7/2006 | |
| JP | 2005-142654 A | 6/2005 | |
| JP | 2006-014086 A | 1/2006 | |
| JP | 2007-259149 A | 10/2007 | |
| JP | 2009-512342 A | 3/2009 | |
| JP | 2010-212811 A | 9/2010 | |
| JP | 2010-532121 A | 9/2010 | |
| WO | 2012167713 A1 | 12/2012 | |
| WO | WO 2012167713 A1 * | 12/2012 | H04N 19/70 |

OTHER PUBLICATIONS

Hrasnica et al. Broadband Powerline Communications: Network Design. Jan. 14, 2005 [retrieved on Aug. 13, 2014], Retrieved from the Internet: <URL: books.google.com/books?isbn=0470857420>.*

Feuvre et al., Clarifications on HEVC Tile Tracks, MPEG, San Jose, USA Jan. 2014, n° M32286 (Year: 2014).*
Tech et al.: MV-HEVC Draft Text 6. Doc. JCTVC-F1004. 6th meeting: Joint Collaborative Team on 3D Video Coding Extension Development (JCT-3V) of ITU-T SG 16 WP 3 and ISO/IEC JTC 1/SC 29/WG 11, Geneva, CH (2013) (Year: 2013).*
Bross et al. High Efficiency Video Coding (HEVC) text specification draft 10 (for FDIS & Last Call). Jan. 14, 2013 [retrieved on Aug. 13, 2014]. Retrieved from the Internet: <URL:cfile25.uf.tistory.com/attach/23c60C63C523FCBDE27C3C5> entire document.
Hrasnica et al. Broadband Powerline Communications: Network Design. Jan. 14, 2005 [retrieved on Aug. 13, 2014]. Retrieved from the Internet: <URL: books.google.com/books?isbn=0470857420> entire document.
MOTO. HEVC—What are CTU, CU, CTB, CB, PB and TB? Oct. 28, 2012 [retrievedon Aug. 13, 2014]. Retrieved from the Internet<URL: http://codesequoia.wordpress.com/2012/10/28/hevc-ctu-cu-ctb-cb-pb-and-tb/> entire document.
European Extended Search Report Received for European Patent Application No. 14783353.7, dated Jun. 23, 2016, p. 14.
Heiko Schwarz et al., "Overview of the Scalable Video Coding Extension of the H.264/AVC Standard", IEEE Transactions on Circuits and Systems for Video Technology, vol. 17, No. 9, Sep. 2007, pp. 1103-1120.
Daijiroh Ichimura et al., "A Tool for Interactive ROI Scalability", Matsushita Electric Industrial Co., Ltd., Contribution to the 74th MPEG meeting, International Organisation for Standardisation Organisation Internationale De Normalisation ISO/IEC JTC1/SC29/WG11 Coding of Moving Pictures and Audio, Jul. 2005, Poznan Poland, 17 Pages.
Ye-Kui Wang et al., "Scalability information SEI for SVC", Joint Video Team (JVT) of ISO/IEC MPEG & ITU-T VCEG (ISO/IEC JTC1/SC29/WG11 and ITU-T SG16 Q.6) 15th Meeting: Busan, Korea, Apr. 16-22, 2005, Nokia Corporation, Document: JVT-O012, 9 Pages.
Men Huang Lee et al. "ROI Slice SEI Message", Joint Video Team (JVT) of ISO/IEC MPEG & ITU-T VCEG (ISO/IEC JTC1/SC29/WG11 and ITU-T SG16 Q.6), 19th Meeting: Geneva, Switzerland, Mar. 31-Apr. 7, 2006, Panasonic Singapore Laboratories Pte. Ltd., Document: JVT-S054, pp. 16.
Truong Cong Thang et al., "SVC CE4: On Signaling for ROI Boundary Handing", International Organisation for Standardisation Organisation Internationale De Normalisation ISO/IEC JTC1/SC29/WG11 Coding of Moving Pictures and Audio, Bangkok, Thailand, Jan. 2006, pp. 11.
Jung-Hwan Lee et al., "Scalable ROI Algorithm for H.264/SVC-Based Video Streaming", IEEE Transactions on Consumer Electronics, vol. 57, No. 2, May 2011, pp. 882-887.
Cheung Auyeung et al., "A Use Case and High Level Syntax of SHVC: Scalability Based Region of Interest", Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, Sony Electronics Inc., Sony Corporation, Document: JCTVC-M0277, p. 1-4.
Office Action for KR Patent Application No. 10-2015-7027258, dated Jan. 11, 2017, 07 pages of Office Action and 06 pages of English Translation.
Office Action for JP Patent Application No. 2016-507615, dated Oct. 25, 2016, 04 pages of Office Action.
Office Action for KR Patent Application No. 10-2015-7027258, dated Jul. 31, 2017, 07 pages of Office Action and 06 pages of English Translation.
Office Action for CN Patent Application No. 201480019943.7, dated Sep. 4, 2017, 7 pages of Office Action and 12 pages of English Translation.
Office Action for JP Patent Application No. 2016-507615, dated May 9, 2017, 05 pages.
Office Action for JP Patent Application No. 2017-238553, dated Aug. 28, 2018, 4 pages of Office Action and 3 pages of English Translation.

(56) References Cited

OTHER PUBLICATIONS

Wang, et al., "Tile Groups", Joint Collaborative Team on Video Coding (JCT-VC) of ITU-T SG16 WP3 and ISO/IEC JTC1/SC29/WG11, 8th Meeting San Jose, JCTVC-H0520r1, Feb. 1-10, 2012, 9 pages.

Yin, et al., "FMO and ROI Scalability", Joint Video Team (JVT) of ISO/IEC MPEG & ITU-T VCEG (ISO/IEC JTC1/SC29/WG11 and ITU-T SG16 Q. 6), 17th meeting, Nice, JVT-Q029, Oct. 14-21, 2005, 9 pages.

Yin, et al., "FMO and ROI Scalability", Joint Video Team (JVT) ISO/IEC MPEG & ITU-T VCEG (ISO/IEC JTC1/SC29/WG11 and ITU-T SG16 Q.6), JVT-Q029, Oct. 14-21, 2005, 10 pages.

Wang, et al., "Tile Groups", Joint Collaborative Team on Video Coding (JCT-VC) of ITU-T SG16 WP3 and ISO/IEC JTC1/SC29/WG11, JCTVC-H0520r1, Feb. 1-10, 2012, 10 pages.

Office Action for JP Patent Application No. 2017-238553, dated Mar. 12, 2019, 03 pages of Office Action and 03 pages of English Translation.

* cited by examiner

REGION OF INTEREST SCALABILITY WITH SHVC

CROSS-REFERENCE TO RELATED APPLICATION(S)

This application claims priority under 35 U.S.C. § 119(e) of the U.S. Provisional Patent Application Ser. No. 61/809,747, filed Apr. 8, 2013 and titled, "REGION OF INTEREST SCALABILITY WITH SHVC" and U.S. Provisional Patent Application Ser. No. 61/846,558, filed Jul. 15, 2013 and titled, "REGION OF INTEREST SCALABILITY WITH SHVC," which are both hereby incorporated by reference in their entireties for all purposes.

FIELD OF THE INVENTION

The present invention relates to the field of imaging. More specifically, the present invention relates to video coding.

BACKGROUND OF THE INVENTION

In Scalable HEVC Model (SHM) 1.0, higher resolution is provided by spatial scalability, and higher quality is provided by Signal-to-Noise Ratio (SNR) scalability, and the enhancement is applied to the entire picture. However, in some applications such as traffic monitoring and security monitoring, enhancement of the entire picture is not necessary.

SUMMARY OF THE INVENTION

Region of Interest (ROI) scalability with SHVC is able to be implemented where scalability is used for part of a picture but not the whole picture. Applications of ROI scalability include traffic monitoring, security monitoring and tiled streaming.

In one aspect, a method programmed in a non-transitory memory of a device comprises acquiring a base layer image and an enhancement layer image and applying a region of interest scalability implementation on part of the enhancement layer image wherein the part of the enhancement layer image is less than the full enhancement layer image. The region of interest scalability implementation includes signaling a region of interest map with a supplemental enhancement information message to manipulate an encoder. The supplemental enhancement information message indicates a location of the region of interest. Each region of interest is one or more rectangular collections of significant coding tree units. The supplemental enhancement information message includes the number of regions of interest, and for each region of interest, an address of a first coding tree unit of each rectangular collection of significant coding tree units in the region of interest in scan order of the image. The address is encoded with differential encoding. The address is encoded without differential encoding. The supplemental enhancement information message includes information to derive the column width of the region of interest in number of coding tree units and information to derive the row height of the region of interest in number of coding tree units. When the supplemental enhancement information message is signaled, the encoder encodes the non-significant coding tree unit of the enhancement layer in a bitstream wherein all non-significant coding tree units of the enhancement layer are copied from a co-located base layer for signal-to-noise ratio scalability. When the supplemental enhancement information message is signaled, the encoder encodes the non-significant coding tree unit of the enhancement layer in a bitstream wherein all non-significant coding tree units of the enhancement layer are copied from a co-located up-sampled base layer for spatial scalability. The region of interest scalability implementation includes supplemental enhancement information messages to indicate that a decoder should not decode non-significant coding tree units of the enhancement layer. The region of interest scalability implementation uses an enhancement layer with a higher spatial resolution than the base layer for recording regions of interest in the image. The region of interest scalability implementation uses an enhancement layer with a frame rate different than the base layer for recording regions of interest in the image.

In another aspect, a system programmed in a non-transitory memory of a camera device comprises a sensor configured for acquiring a base layer image and an enhancement layer image and an applying component configured for applying a region of interest scalability implementation on part of the enhancement layer image wherein the part of the enhancement layer image is less than the full enhancement layer image. The region of interest scalability implementation includes signaling a region of interest map with a supplemental enhancement information message to manipulate an encoder. The supplemental enhancement information message indicates a location of the region of interest. Each region of interest is one or more rectangular collections of significant coding tree units. The supplemental enhancement information message includes the number of regions of interest, and for each region of interest, an address of a first coding tree unit of each rectangular collection of significant coding tree units in the region of interest in scan order of the image. The address is encoded with differential encoding. The address is encoded without differential encoding. The supplemental enhancement information message includes information to derive the column width of the region of interest in number of coding tree units and information to derive the row height of the region of interest in number of coding tree units. When the supplemental enhancement information message is signaled, the encoder encodes the non-significant coding tree unit of the enhancement layer in a bitstream wherein all non-significant coding tree units of the enhancement layer are copied from a co-located base layer for signal-to-noise ratio scalability. When the supplemental enhancement information message is signaled, the encoder encodes the non-significant coding tree unit of the enhancement layer in a bitstream wherein all non-significant coding tree units of the enhancement layer are copied from a co-located up-sampled base layer for spatial scalability. The region of interest scalability implementation includes supplemental enhancement information messages to indicate that a decoder should not decode non-significant coding tree units of the enhancement layer. The region of interest scalability implementation uses an enhancement layer with a higher spatial resolution than the base layer for recording regions of interest in the image. The region of interest scalability implementation uses an enhancement layer with a frame rate different than the base layer for recording regions of interest in the image.

In another aspect, an apparatus comprises a non-transitory memory for storing an application, the application for: acquiring a base layer image and an enhancement layer image and applying a region of interest scalability implementation on part of the enhancement layer image wherein the part of the enhancement layer image is less than the full enhancement layer image and a processing component coupled to the memory, the processing component configured for processing the application. The region of interest scalability implementation includes signaling a region of interest map with a supplemental enhancement information message to manipulate an encoder. The supplemental enhancement information message indicates a location of the region of interest. Each region of interest is one or more rectangular collections of significant coding tree units. The supplemental enhancement information message includes the number of regions of interest, and for each region of interest, an address of a first coding tree unit of each rectangular collection of significant coding tree units in the region of interest in scan order of the image. The address is encoded with differential encoding. The address is encoded without differential encoding. The supplemental enhancement information message includes information to derive the column width of the region of interest in number of coding tree units and information to derive the row height of the region of interest in number of coding tree units. When the supplemental enhancement information message is signaled, the encoder encodes the non-significant coding tree unit of the enhancement layer in a bitstream wherein all non-significant coding tree units of the enhancement layer are copied from a co-located base layer for signal-to-noise ratio scalability. When the supplemental enhancement information message is signaled, the encoder encodes the non-significant coding tree unit of the enhancement layer in a bitstream wherein all non-significant coding tree units of the enhancement layer are copied from a co-located up-sampled base layer for spatial scalability. The region of interest scalability implementation includes supplemental enhancement information messages to indicate that a decoder should not decode non-significant coding tree units of the enhancement layer. The region of interest scalability implementation uses an enhancement layer with a higher spatial resolution than the base layer for recording regions of interest in the image. The region of interest scalability implementation uses an enhancement layer with a frame rate different than the base layer for recording regions of interest in the image.

DETAILED DESCRIPTION OF THE PREFERRED EMBODIMENT

Figure 1:
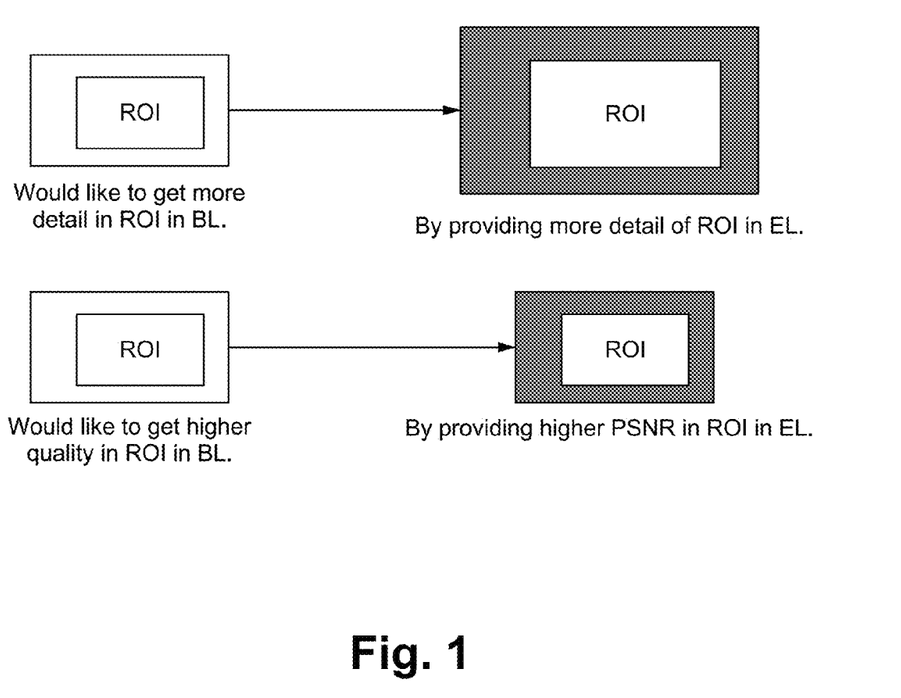
FIG. 1 illustrates diagrams of ROI scalability according to some embodiments.

In an intelligent traffic monitoring system, security monitoring system or any other system, computer vision is able to be combined with the video recording system to intelligently identify one or more Regions of Interest (ROIs). As shown in FIG. 1, the recording system is able to record a low resolution picture with a wider viewing area as a base and one or more ROIs in the picture with higher spatial resolution or higher picture quality as enhancement. The ROI is also able to be recorded in the enhancement layer with a frame rate different from the base layer.

An application using ROI scalability is only interested in providing scalability within the ROIs. Therefore, pixels in the ROIs are significant to a scalable decoder, and pixels outside the ROIs are non-significant to the decoder.

In some embodiments, the following is defined:
An ROI is one or more rectangular collections of Coding Tree Units (CTUs).
An enhancement layer picture has one or more ROIs.
A CTU in an ROI is defined as a significant CTU.
A CTU which is not in any ROI is defined as a non-significant CTU.

The coding of an ROI is able to be performed with high level syntax changes, low level syntax changes or both.

A method of providing more detail in an ROI is described herein. For ROI with spatial scalability, a desire is to provide more detail in the ROI in the Base Layer (BL). This is able to be achieved by providing more detail of ROI in the Enhancement Layer (EL). The location of the ROI and the enhancement data is important.

For ROI with Signal-to-Noise Ratio (SNR) scalability, a desire is to provide more detail in the ROI in the Base Layer (BL). This is able to be achieved by providing a higher Peak SNR (PSNR) of the ROI in the Enhancement Layer (EL). The location of the ROI and the enhancement data is important.

For ROI with scalability, the CTUs in a picture are divided into two disjointed groups. The CTUs in one of the groups are designated as significant. The significant CTUs are one or more rectangular collection of CTUs. An ROI is one or more rectangular collections of significant CTUs. The CTUs in the other group are designated as non-significant. For SNR scalability, non-significant CTUs are reconstructed by an EL decoder by copying the pixels from the co-located base layer. For spatial scalability, non-significant CTUs are reconstructed by an EL decoder by copying the pixels from the co-located up-sampled base layer. Depending on the signaling method, each non-significant CTU may or may not be encoded in a slice segment data.

The location of the CTUs of the two groups is signaled by one of the following types of methods: explicitly or implicitly. In the explicit method, the location of the regions of interest are signaled explicitly in a bitstream. In the implicit method, the location of the regions of interest are not signaled explicitly in a bitstream. The locations are derived implicitly by other means, for example, by Network Abstraction Layer (NAL) type.

There are multiple methods to extend SHVC to signal ROI with high level syntax. The following methods are described:
  encoder trick with SEI message to signal the ROI map;
  SEI messages to indicate that the decoder is not required to decode non-significant CTUs;
  explicit signaling of ROI map with tile method 1;
  explicit signaling of ROI map with tile method 2;
  implicit signaling of ROI map with tile; and
  implicit signaling of ROI map without tile.

Explicit ROI Map with Encoder Trick

The enhancement layer is encoded with a Supplemental Enhancement Information (SEI) message to indicate the location of the region of interest. A picture has one or more ROIs. Each ROI is one or more rectangular collections of significant CTUs. The SEI messages include the number of ROIs, and for each ROI, the address of the first CTU of each rectangular collection of significant CTUs in the ROI in scan order of the picture, the address is encoded with/without differential encoding, information to derive the column width of the ROI in number of CTUs and the information to derive the row height of the ROI in number of CTUs. When the SEI is signaled, the encoder encodes the non-significant CTU of the enhancement layer in a bitstream with the following results: for SNR scalability, all non-significant CTUs of the enhancement layer are copied from the co-located base layer. For spatial scalability, all non-significant CTUs of the enhancement layer are copied from the co-located up-sampled base layer.

Table 1 shows a regions of interest SEI message syntax without differential encoding.

|  | Descriptor |
|---|---|
| region_of_interest_map(payloadSize) { | |
|   num_of_region_of_interest_minus1 | ue(v) |
|   for(i=0; i<= num_of_region_of_interest_minus1; i++) | |
|   { | |
|     roi_address[i] | ue(v) |
|     roi_column_width_minus1[i] | ue(v) |
|     roi_row_height_minus1[i] | ue(v) |
|   } | |
| } | |

Table 2 shows a regions of interest SEI message syntax with differential encoding.

|  | Descriptor |
|---|---|
| region_of_interest_map(payloadSize) { | |
|   num_of_region_of_interest_minus1 | ue(v) |
|   address = −1 | |
|   for(i=0; i<= num_of_region_of_interest_minus1; i++) | |
|   { | |
|     roi_address_delta_minus1 | ue(v) |
|     address = address + roi_address_delta_minus1 + 1 | |
|     roi_address[i] = address | |
|     roi_column_width_minus1[i] | ue(v) |
|     roi_row_height_minus1[i] | ue(v) |
|   } | |
| } | |

Table 3 shows inter-layer constrained tile sets SEI message syntax

|  | Descriptor |
|---|---|
| inter_layer_constrained_tile_sets( payloadSize) { | |
|   il_all_tiles_exact_sample_value_match_flag | u(1) |
|   il_one_tile_per_tile_set_flag | u(1) |
|   if(!il_one_tile_per_tile_set_flag) { | |
|     il_num_sets_in_message_minus1 | ue(v) |
|     if(il_num_sets_in_message_minus1) | |
|       skipped_tile_set_present_flag | u(1) |
|     numSignificantSets = il_num_sets_in_message_minus1 − | |
|       skipped_tile_set_present_flag + 1 | |
|     for (i = 0; i < numSignificantSets; i++) { | |
|       ilcts_id[i] | ue(v) |
|       il_num_tile_rects_in_set_minus1[i] | ue(v) |
|       for (j=0; j<=il_num_tile_rects_in_set_minus1[i]; j++) { | |
|         il_top_left_tile_index[i][j] | ue(v) |
|         il_bottom_right_tile_index[i][j] | ue(v) |
|       } | |
|       ilc_idc[i] | u(2) |
|       if(!il_all_tiles_exact_sample_value_match_flag) | |
|         il_exact_sample_value_match_flag[i] | u(1) |
|     } | |
|   } else | |
|     all_tiles_ilc_idc | u(2) |
| } | |

The scope of the inter-layer constrained tile sets SEI message is the complete Coded Video Stream (CVS). When an inter-layer tile sets SEI message is present in any access unit of a CVS, it shall be present for the first access unit of the CVS in decoding order and may also be present for other access units of the CVS.

The inter-layer constrained tile sets SEI message shall not be present for a layer when tiles_enabled_flag is equal to 0 for any PPS that is active for the layer.

The inter-layer constrained tile sets SEI message shall not be present for a layer unless every PPS that is active for the layer has tile_boundaries_aligned_flag equal to 1 or fulfills the conditions that would be indicated by tile_boundaries_aligned_flag being equal to 1.

The presence of the inter-layer tile sets SEI message indicates that the inter-layer inter prediction process is constrained such that no sample value outside each identified tile set, and no sample value at a fractional sample position that is derived using one or more sample values outside the identified tile set, is used for inter-layer prediction of any sample within the identified tile set.

When loop filtering and a resampling filter is applied across tile boundaries, inter-layer prediction of any samples within an inter-layer constrained tile set that refers to samples within 8 samples from an inter-layer constrained tile set boundary that is not also a picture boundary may result in propagation of mismatch error. An encoder can avoid such potential error propagation by avoiding the use of motion vectors that cause such references.

When more than one inter-layer constrained tile sets SEI message are present within the access units of a CVS, they shall contain identical content.

The number of inter-layer constrained tile sets SEI messages in each access unit shall not exceed 5, in some embodiments.

il_all_tiles_exact_sample_value_match_flag equal to equal to 1 indicates that, within the CVS, when the coding tree blocks that are outside of any identified tile are not decoded and the boundaries of the identified tile is treated as picture boundaries for purposes of the decoding process, the value of each sample in the identified tile would be exactly the same as the value of the sample that would be obtained when all the coding tree blocks of all pictures in the CVS are decoded. il_all_tiles_exact_sample_value_match_flag equal to 0 indicates that, within the CVS, when the coding tree blocks that are outside of any identified tile are not decoded and the boundaries of the identified tile is treated as picture boundaries for purposes of the decoding process, the value of each sample in the identified tile may or may not be exactly the same as the value of the same sample when all the coding tree blocks of all pictures in the CVS are decoded.

il_one_tile_per_tile_set_flag equal to 1 indicates that each inter-layer constrained tile set contains one tile, and il_num_sets_in_message_minus1 is not present. When il_one_tile_per_tile_set_flag is equal to zero, tile sets are signaled explicitly.

il_num_sets_in_message_minus1 plus 1 specifies the number of inter-layer tile sets identified in the SEI message. The value of il_num_sets_in_message_minus1 shall be in the range of 0 to 255, inclusive.

skipped_tile_set_present_flag equal to 1 indicates that, within the CVS, the tile set includes those remaining tiles that are not included in any earlier tile sets in the same message, and all the prediction blocks that are inside the identified tile set having nuh_layer_id equal to ictsNuhLayerId are inter-layer predicted from inter-layer reference pictures with nuh_layer_id equal to RefLayerId[ictsNuhLayerId][NumDirectRefLayers[ictsNuhLayerId]−1] and no residual_coding( ) syntax structure is present in any transform unit of the identified tile set, where ictsNuhLayerId is the value of nuh_layer_id of this SEI message. skipped_tile_set_present_flag equal to 0 does not indicate a bitstream constraint within the CVS. When not present, the value of skipped_tile_set_present_flag is inferred to be equal to 0.

ilcts_id[i] contains an identifying number that may be used to identify the purpose of the i-th identified tile set (for example, to identify an area to be extracted from the coded video sequence for a particular purpose). The value of ilcts_id[i] shall be in the range of 0 to $2^{32}-2$, inclusive.

Values of ilcts_id[i] from 0 to 255 and from 512 to $2^{31}-1$ may be used as determined by the application. Values of ilcts_id[i] from 256 to 511 and from $2^{31}$ to $2^{32}-2$ are reserved for future use by ITU-T|ISO/IEC. Decoders encountering a value of ilcts_id[i] in the range of 256 to 511 or in the range of $2^{31}$ to $2^{32}-2$ shall ignore (remove from the bitstream and discard) it.

il_num_tile_rects_in_set_minus1 [i] plus 1 specifies the number of rectangular regions of tiles in the i-th identified inter-layer constrained tile set. The value of il_num_tile_rects_in_set_minus1 [i] shall be in the range of 0 to (num_tile_columns_minus1+1)*(num_tile_rows_minus1+1)−1, inclusive.

il_top_left_tile_index[i][j] and il_bottom_right_tile_index[i][j] identify the tile position of the top-left tile and the tile position of the bottom-right tile in a rectangular region of the i-th identified inter-layer constrained tile set, respectively, in tile raster scan order.

ilc_idc[i] equal to 1 indicates that, within the CVS, no samples outside of the i-th identified tile set and no samples at a fractional sample position that is derived using one or more samples outside of the i-th identified tile set are used for inter-layer prediction of any sample within the i-th identified tile set with nuh_layer_id equal to ictsNuhLayerId, where ictsNuhLayerId is the value of nuh_layer_id of this message. ilc_idc[i][j] equal to 2 indicates that, within the CVS, no prediction block in the i-th identified tile set with nuh_layer_id equal to ictsNuhLayerId is predicted from an inter-layer reference picture. ilc_idc[i] equal to 0 indicates that, within the CVS, the inter-layer prediction process may or may not be constrained for the prediction block in the i-th identified tile set having nuh_layer_id equal to ictsNuhLayerId. The value of ilc_idc[i] equal to 3 is reserved.

il_exact_sample_value_match_flag[i] equal to 1 indicates that, within the CVS, when the coding tree blocks that do not belong to the inter-layer constrained tile set are not decoded and the boundaries of i-th the inter-layer constrained tile set are treated as picture boundaries for purposes of the decoding process, the value of each sample in the inter-layer constrained tile set would be exactly the same as the value of the sample that would be obtained when all the coding tree blocks of all pictures in the coded video sequence are decoded. il_exact_sample_value_match_flag[i] equal to 0 indicates that, within the CVS, when the coding tree blocks that are outside of the i-th identified inter-layer constrained tile set are not decoded and the boundaries of the i-th inter-layer constrained tile set are treated as picture boundaries for purposes of the decoding process, the value of each sample in the identified tile set may or may not be exactly the same as the value of the same sample when all the coding tree blocks of the picture are decoded.

It is feasible to use il_exact_sample_value_match_flag equal to 1 when using certain combinations of loop_filter_across_tiles_enabled_flag, pps_loop_filter_across_slices_enabled_flag, pps_deblocking_filter_disabled_flag, slice_loop_filter_across_slices_enabled_flag, slice_deblocking_filter_disabled_flag, sample_adaptive_offset_enabled_flag, slice_sao_luma_flag, and slice_sao_chroma_flag. all_tiles_ilc_idc equal to 1 indicates that, within the CVS, no sample value outside of each identified tile and no sample value at a fractional sample position that is derived using one or more samples outside of the identified tile is used for inter-layer prediction of any sample within the identified tile with nuh_layer_id equal to ictsNuhLayerId, where ictsNuhLayerId is the value of nuh_layer_id of this SEI message. all_tiles_ilc_idc equal to 2 indicates that, within the CVS, no prediction block in each identified tile with nuh_layer_id equal to ictsNuhLayerId is predicted from an inter-layer reference picture. The all_tiles_ilc_idc equal to 0 indicates that, within the CVS, the inter-layer prediction process may or may not be constrained for the tile having nuh_layer_id equal to ictsNuhLayerId. The value of all_tiles_ilc_idc equal to 3 is reserved.

Do not Decode SEI Message

A do not decode SEI message is able to be sent to indicate that a decoder is not required to decode the non-significant CTU of the enhancement layer in order to decode the significant CTU of the enhancement layer. This is able to indicate the encoder had put a restriction on the motion compensation process, the intra prediction process and/or the entropy coding process.

Explicit ROI Map with Tile Method 1

The enhancement layer is encoded with the following: tile structure, each ROI is a rectangular region of tiles and the ROI map is signaled by a list of significant tiles.

A tile which is in an ROI is called a significant tile; otherwise, the tile is a non-significant tile. A significant tile is a collection of significant CTUs. A non-significant tile is a collection of non-significant CTUs.

The list of significant tiles is signaled by: Picture Parameter Set (PPS) Raw Byte Sequence Payload (RBSP) or a new RBSP-type above the slice segment layer RBSP. The list is signaled by a list of tile indexes. The tile index is the index of tiles in scan order of the tiles in a picture. The tile index is encoded with or without differential coding.

The enhancement layer is also encoded with the following conditions. If the first tile is not the first significant tile, then it is encoded with all of the following conditions: the collection of all non-significant tiles before the first significant tile is the first slice of a picture, and the first CTU of the first significant tile is the first CTU of the second slice. Otherwise, the first tile is the first significant tile, and the first CTU of the first significant tile is the first CTU of the first slice. The first CTU of a slice is either the first CTU of a picture or the first CTU of a significant tile. If there are one or more non-significant tiles between two significant tiles, the non-significant tiles between two significant tiles form a slice segment. If there are one or more non-significant tiles after the last significant tile in a picture, the non-significant tiles after the last significant tile form a slice segment. One of the conditions is true: a consecutive number of significant tiles form a slice or a slice segment, or a significant tile is one or more slices or slice segments. An optional message is able to be used to indicate that each ROI is independently decodable by restricting the motion compensation process to within an ROI. The restriction is on an individual ROI in the enhancement layer in SHVC.

Figure 2:
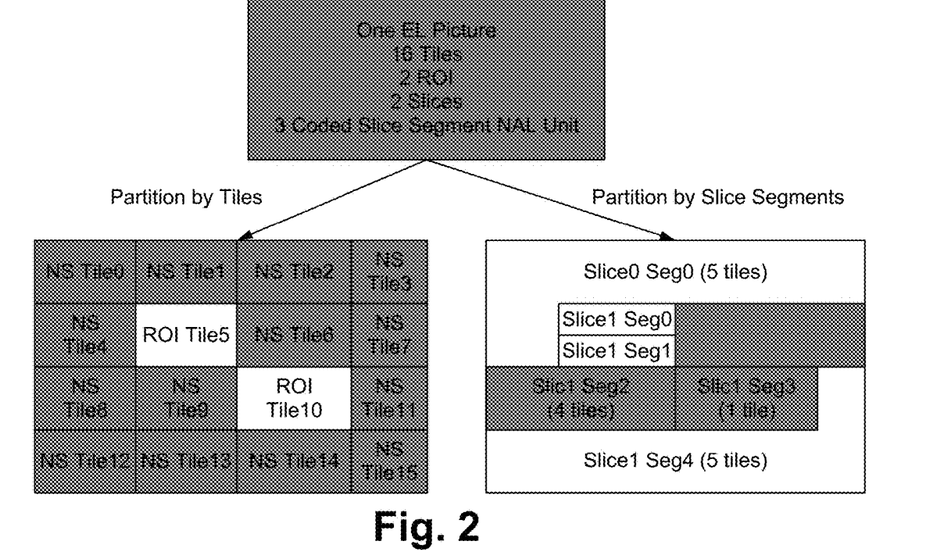
FIG. 2 illustrates a diagram of an exemplary tile by method 1 according to some embodiments.

FIG. 2 illustrates a block diagram of an example of a tile with method 1. The enhancement layer picture is divided into 16 tiles. A non-significant tile of the enhancement layer is a tile with only non-significant CTUs. A non-significant CTU of the enhancement layer is a CTU with its pixels copied from either the base layer (SNR scalability) or from an interpolated base layer (spatial scalability). As shown in FIG. 2, Tile5 has two slice segments, and Tile10 has one slice segment. Only Tile5 and Tile10 are significant tiles. Only Tile5 and Tile10 are coded with slice_segment_layer_rbsp( ). Non-significant tiles are signaled by non-significant slice segment layer RBSP, and the significant tiles are signaled by regular slice segment layer RBSP.

Explicit ROI Map with Tile Method 2

The enhancement layer is encoded with the following. The enhancement layer is encoded with a tile structure. Each ROI is a rectangular region of tiles. A tile which is in an ROI is called a significant tile; otherwise, the tile is a non-significant tile. A significant tile is a collection of significant CTUs. A non-significant tile is a collection of non-significant CTUs.

The ROI map is signaled by a list of significant tiles. The list of significant tiles is signaled by: Picture Parameter Set (PPS) Raw Byte Sequence Payload (RBSP) or a new RBSP-type above the slice segment layer RBSP. The list is signaled by a list of tile indexes. The tile index is the index of tiles in scan order of the tiles in a picture. The tile index is encoded with or without differential coding.

If a slice segment has one or more tiles, then all of the following are encoded to be true: the slice segment has one or more significant tiles; if it has more than one significant tile, the significant tiles are in consecutive order (e.g., the CTUs in slice_segment_date( ) are in consecutive order) and the last tile in the slice segment is significant except that it is the last slice segment in a picture.

If a tile has one or more segments, the tile is significant.

An optional message is able to be used to indicate that each ROI is independently decodable by restricting the motion compensation process to within an ROI. The restriction is on an individual ROI in the enhancement layer in SHVC.

Figure 3:
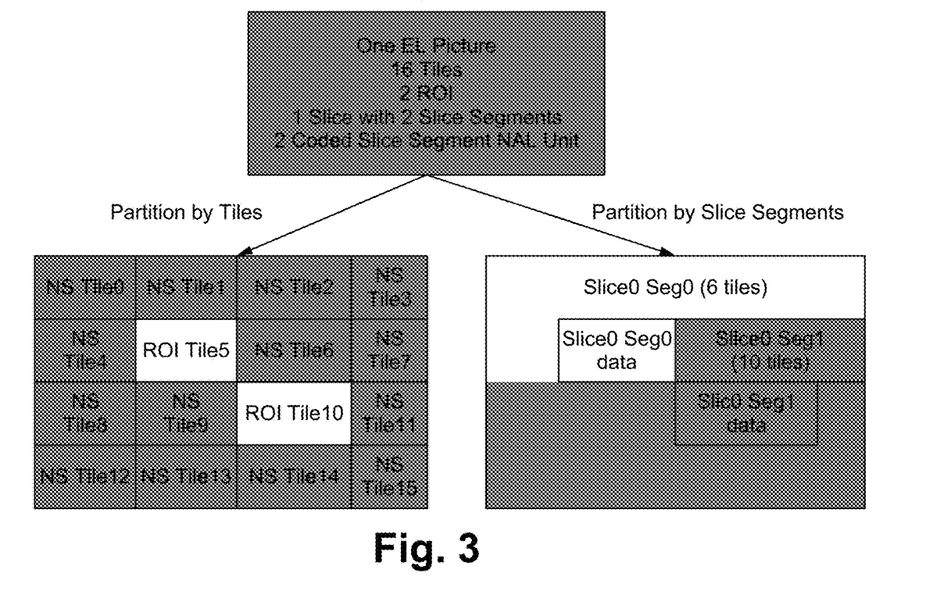
FIG. 3 illustrates a diagram of an exemplary tile by method 2 according to some embodiments.

FIG. 3 illustrates a block diagram of an example of a tile with method 2. The picture is divided into 16 tiles. A non-significant tile is a tile with only non-significant CTUs. A non-significant CTU is a CTU with its pixels copied from either the base layer (SNR scalability) or from an interpolated base layer (spatial scalability). As shown in FIG. 3, Tile5 is encoded in slice_segment_data( ) of Slice0-Seg0, and Tile10 is encoded in slice_segment_data( ) of Slice0-Seg1.

Table 4 shows exemplary code of an explicit ROI Map with Tile in PPS.

| | Descriptor |
|---|---|
| pic_parameter_set_rbsp( ) { | |
|     pps_pic_parameter_set_id | ue(v) |
|     pps_seq_parameter_set_id | ue(v) |
|     dependent_slice_segments_enabled_flag | u(1) |
|     output_flag_present_flag | u(1) |
|     numb_extra_slice_header_bits | u(3) |
|     sign_data_hiding_enabled_flag | u(1) |
|     cabac_init_present_flag | u(1) |
|     num_ref_idx_10_default_active_minus1 | ue(v) |
|     num_ref_idx_11_default_active_minus1 | ue(v) |
|     init_qp_minus26 | se(v) |
|     constrained_intra_pred_flag | u(1) |
|     transform_skip_enabled_flag | u(1) |
|     cu_qp_delta_enabled_flag | u(1) |
|     if(cu_qp_delta_enabled_flag) | |
|         diff_cu_qp_delta_depth | ue(v) |
|     pps_cb_qp_offset | se(v) |
|     pps_cr_qp_offset | u(1) |
|     pps_slice_chroma_qp_offsets_present_flag | u(1) |
|     weighted_pred_flag | u(1) |
|     weighted_bipred_flag | u(1) |
|     transquant_bypass_enabled_flag | u(1) |
|     tiles_enabled_flag | u(1) |
|     entropy_coding_sync_enabled_flag | u(1) |
|     if (tiles_enabled_flag) { | |
|         num_tile_columns_minus1 | ue(v) |
|         num_tile_rows_minus1 | ue(v) |
|         uniform_spacing_flag | u(1) |
|         if (!uniform_spacing_flag) { | |
|             for (i=0; i<num_tile_columns_minus1; i++) | |
|                 column_width_minus1[i] | ue(v) |
|             for (i=0; i<num_tile_rows_minus1; i++) | |
|                 row_height_minus1[i] | ue(v) |
|         } | |
|         loop_filter_across_tiles_enabled_flag | u(1) |
|         if (nuh_layer_id > 0) { | |
|             tile_significance_map_enabled_flag | u(1) |
|             if (tile_significance_map_enabled_flag) { | |
|                 tile_significance_map( ) | |
|             } | |
|         } | |
|     } | |
|     pps_loop_filter_across_slices_enabled_flag | u(1) |
|     deblocking_filter_control_present_flag | u(1) |
|     if(deblocking_filter_control_present_flag) { | |
|         deblocking_filter_override_enabled_flag | u(1) |
|         pps_deblocking_filter_disabled_flag | u(1) |
|         if(!pps_deblocking_filter_disabled_flag) { | |
|             pps_beta_offset_div2 | se(v) |
|             pps_tc_offset_div2 | se(v) |
|         } | |
|     } | |
|     pps_scaling_list_data_present_flag | u(1) |
|     if(pps_scaling_list_data_present_flag) | |
|         scaling_list_data( ) | |
|     lists_modification_present_flag | u(1) |
|     log2_parallel_merge_level_minus2 | ue(v) |
|     slice_segment_header_extension_present_flag | u(1) |
|     pps_extension_flag | u(1) |
|     if(pps_extension_flag) | |
|         while(more_rbsp_data( ) ) | |
|             pps_extension_data_flag | u(1) |
|     rbsp_trailing_bits( ) | |
| } | |

Table 5 tile significance map with differential encoding on tile index

| Descriptor |
|---|
| tile_significance_map( ) { |
|     num_significance_tile_minus1      ue(v) |
|     tile_index = −1 |
|     for (i = 0; i<= num_significance_tile_minus1; i++) { |
|         tile_index_delta_minus1      ue(v) |
|         tile_index = tile_index + |
|         tile_index_delta_minus1 + 1 |
|         tile_significance_list[i] = tile_index |
|     } |
| } |

Table 6 tile significance map without differential encoding on tile index

| Descriptor |
|---|
| tile_significance_map( ) { |
|     num_significance_tile_minus1      ue(v) |
|     for (i = 0; i<= num_significance_tile_minus1; i++) { |
|         tile_index      ue(v) |
|         tile_significance_list[i] = tile_index |
|     } |
| } |

Implicit ROI Map with Tile

The enhancement layer is encoded with the following. The enhancement layer is encoded with a tile structure. A tile is either a significant tile or non-significant tile. A significant tile is a collection of significant CTUs. A non-significant tile is a collection of non-significant CTUs. One of the following is encoded to be true: a significant tile includes one or more slices or slice segments, or a consecutive number of significant tiles is a slice or a slice segment.

The ROI map is signaled implicitly as in the following. One or more non-significant tiles are signaled by means of a non_significant_slice_segment_rbsp( ) with a new NAL unit type for non-significant slice segment. A significant tile is encoded in an NAL unit with nal_unit_type indicating it is a coded slice segment NAL unit.

An optional message is able to be used to indicate that each ROI is independently decodable by restricting the motion compensation process to within an ROI. The restriction is on individual ROI in the enhancement layer in SHVC.

Table 7 shows a non_significant_layer_rbsp( ) with Tile

| Descriptor |
|---|
| non_significant_slice_segment_layer_rbsp( ) { |
|     slice_segment_header( ) |
|     slice_segment_size_minus1      ue(v) |
|     rbsp_slice_segment_trailing_bits( ) |
| } |

Figure 4:
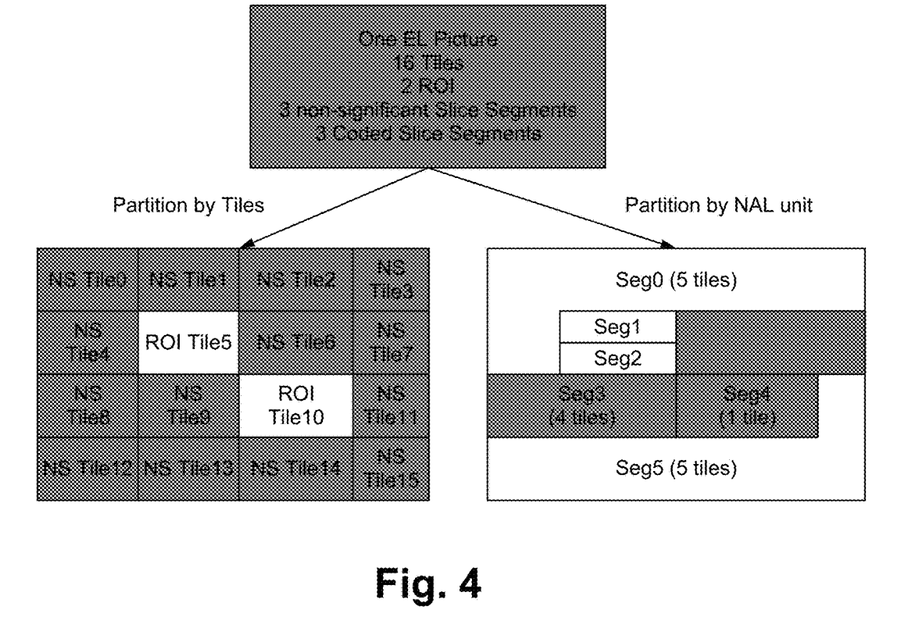
FIG. 4 illustrates a diagram of an exemplary implicit ROI map with tile according to some embodiments.

FIG. 4 illustrates a diagram of an implicit ROI map with tile. The picture is divided into 16 tiles. A non-significant tile is a tile with only non-significant CTUs. A non-significant CTU is a CTU with its pixels copied from either the base layer (SNR scalability) or from an interpolated base layer (spatial scalability). As shown in FIG. 4, Seg0, Seg3 and Seg5 are non-significant slice segments. Seg1, Seg2 and Seg4 are regular slice segments.

Implicit ROI Map without Tile

The enhancement layer is encoded with the following. The ROI map is signaled implicitly as in the following. One or more non-significant CTUs are signaled by means of a non_significant_slice_segment_rbsp( ) with a new NAL unit type for a non-significant slice segment. One or more consecutive significant CTUs are encoded in a NAL unit with nal_unit_type indicating it is a coded slice segment NAL unit.

An optional message is able to be used to indicate that each ROI is independently decodable by restricting the motion compensation process to within an ROI. The restriction is on individual ROI in the enhancement layer in SHVC.

Table 8 shows a non_significant_layer_rbsp( ) without Tile

| Descriptor |
|---|
| non_significant_slice_segment_layer_rbsp( ) { |
|     slice_segment_header( ) |
|     slice_segment_size_minus1      ue(v) |
|     rbsp_slice_segment_trailing_bits( ) |
| } |

Table 9 shows exemplary code of an explicit ROI Map in PPS.

| | Descriptor |
|---|---|
| pic_parameter_set_rbsp( ) { | |
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   numb_extra_slice_header_bits | u(3) |
|   sign_data_hiding_enabled_flag | u(1) |
|   cabac_init_present_flag | u(1) |
|   num_ref_idx_10_default_active_minus1 | ue(v) |
|   num_ref_idx_11_default_active_minus1 | ue(v) |
|   init_qp_minus26 | se(v) |
|   constrained_intra_pred_flag | u(1) |
|   transform_skip_enabled_flag | u(1) |
|   cu_qp_delta_enabled_flag | u(1) |
|   if(cu_qp_delta_enabled_flag) | |
|     diff_cu_qp_delta_depth | ue(v) |
|   pps_cb_qp_off set | se(v) |
|   pps_cr_qp_offset | u(1) |
|   pps_slice_chroma_qp_offsets_present_flag | u(1) |
|   weighted_pred_flag | u(1) |
|   weighted_bipred_flag | u(1) |
|   transquant_bypass_enabled_flag | u(1) |
|   tiles_enabled_flag | u(1) |
|   entropy_coding_sync_enabled_flag | u(1) |
|   if (tiles_enabled_flag) { | |
|     num_tile_columns_minus1 | ue(v) |
|     num_tile_rows_minus1 | ue(v) |
|     uniform_spacing_flag | u(1) |
|     if (!uniform_spacing_flag) { | |
|       for (i=0; i<num_tile_columns_minus1; i++) | |
|         column_width_minus1[i] | ue(v) |
|       for (i=0; i<num_tile_rows_minus1; i++) | |
|         row_height_minus1[i] | ue(v) |
|     } | |
|     loop_filter_across_tiles_enabled_flag | u(1) |
|     if (nuh_layer_id > 0) { | |
|       region_of_interest_map_enabled_flag | u(1) |
|       if (region_of_interest_map_enabled_flag) { | |
|         region_of_interest_map( ) | |
|       } | |
|     } | |
|   } | |
|   pps_loop_filter_across_slices_enabled_flag | u(1) |
|   deblocking_filter_control_present_flag | u(1) |
|   if(deblocking_filter_control_present_flag) { | |
|     deblocking_filter_override_enabled_flag | u(1) |
|     pps_deblocking_filter_disabled_flag | u(1) |
|     if(!pps_deblocking_filter_disabled_flag) { | |
|       pps_beta_offset_div2 | se(v) |
|       pps_tc_offset_div2 | se(v) |
|     } | |
|   } | |

-continued

| | Descriptor |
|---|---|
| pps_scaling_list_data_present_flag | u(1) |
| if(pps_scaling_list_data_present_flag) | |
|     scaling_list_data( ) | |
| lists_modification_present_flag | u(1) |
| log2_parallel_merge_level_minus2 | ue(v) |
| slice_segment_header_extension_present_flag | u(1) |
| pps_extension_flag | u(1) |
| if(pps_extension_flag) | |
|     while(more_rbsp_data( ) ) | |
|         pps_extension_data_flag | u(1) |
| rbsp_trailing_bits( ) | |
| } | |

Table 10 shows a region of interest map without differential encoding.

| | Descriptor |
|---|---|
| region_of_interest_map( ) { | |
|   num_of_region_of_interest_minus1 | ue(v) |
|   for(i=0; i<= num_of_region_of_interest_minus1; i++) | |
|   { | |
|     roi_address[i] | ue(v) |
|     roi_column_width_minus1[i] | ue(v) |
|     roi_row_height_minus1[i] | ue(v) |
|   } | |
| } | |

Table 11 shows a region of interest map with differential encoding.

| | Descriptor |
|---|---|
| region_of_interest_map( ) { | |
|   num_of_region_of_interest_minus1 | ue(v) |
|   address = −1 | |
|   for(i=0; i<= num_of_region_of_interest_minus1; i++) | |
|   { | |
|     roi_address_delta_minus1 | ue(v) |
|     address = address + roi_address_delta_minus1 + 1 | |
|     roi_address[i] = address | |
|     roi_column_width_minus1[i] | ue(v) |
|     roi_row_height_minus1[i] | ue(v) |
|   } | |
| } | |

Skipped Picture and Skipped Slice

A non-significant slice segment is able to indicate that the CTUs in the slice segment are reconstructed by an SHVC decoder by copying the pixels from the base layer for SNR scalability or by copying the pixels from the up-sampled base layer for spacial scalability.

When the whole picture in the enhancement layer includes only one or more non-significant slice segments, all of the CTUs in the picture are reconstructed by an SHVC decoder by copying the pixels from the base layer for SNR scalability or by copying the pixels from the up-sampled base layer for spatial scalability.

When the whole slice in the enhancement layer includes only one or more non-significant slice segments, all of the CTUs in the slice are reconstructed by an SHVC decoder by copying the pixels from the base layer for SNR scalability or by copying the pixels from the up-sampled base layer for spatial scalability.

Figure 5:
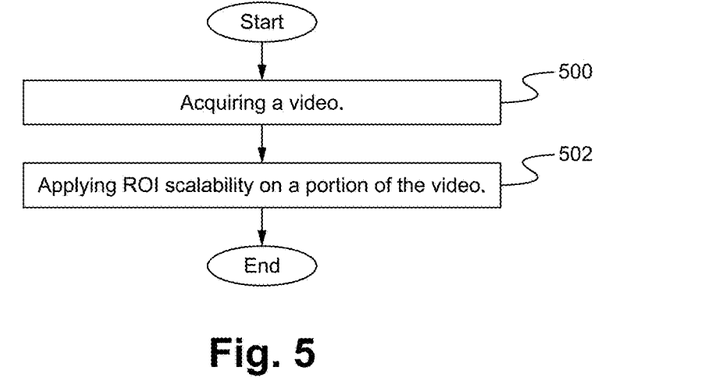
FIG. 5 illustrates a flowchart of a method of utilizing an ROI scalability method according to some embodiments.

FIG. 5 illustrates a flowchart of a method of implementing the ROI scalability method according to some embodiments. In the step 500, a video is acquired. In some embodiments, a base layer image and an enhancement layer image are acquired. In the step 502, the ROI scalability method is applied on part of the video or images within the video. In some embodiments, the ROI scalability method is applied on part of the enhancement layer image. In some embodiments, the ROI scalability method is applied during and/or after the video is acquired. For example, the ROI scalability method is applied while the video is being recorded. In some embodiments, fewer or additional steps are implemented.

Figure 6:
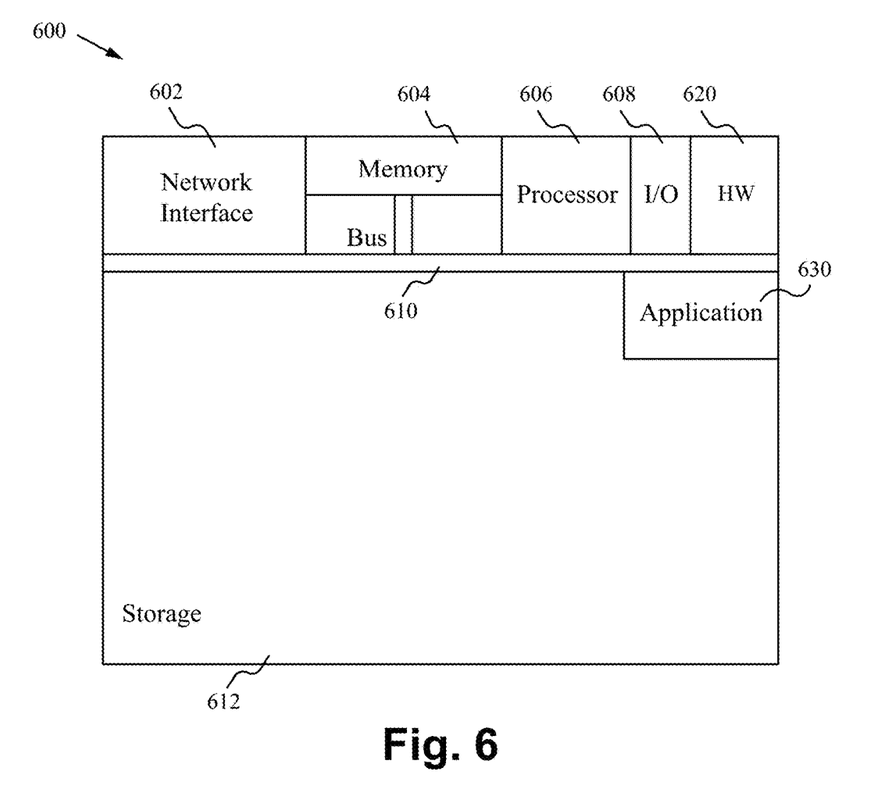
FIG. 6 illustrates a block diagram of an exemplary computing device configured to implement the ROI scalability method according to some embodiments.

FIG. 6 illustrates a block diagram of an exemplary computing device configured to implement the ROI scalability method according to some embodiments. The computing device 600 is able to be used to acquire, store, compute, process, communicate and/or display information such as images and videos. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. ROI scalability application(s) 630 used to perform the ROI scalability method are likely to be stored in the storage device 612 and memory 604 and processed as applications are typically processed. More or fewer components shown in FIG. 6 are able to be included in the computing device 600. In some embodiments, ROI scalability hardware 620 is included. Although the computing device 600 in FIG. 6 includes applications 630 and hardware 620 for the ROI scalability method, the ROI scalability method is able to be implemented on a computing device in hardware, firmware, software or any combination thereof. For example, in some embodiments, the ROI scalability applications 630 are programmed in a memory and executed using a processor. In another example, in some embodiments, the ROI scalability hardware 620 is programmed hardware logic including gates specifically designed to implement the ROI scalability method.

In some embodiments, the ROI scalability application(s) 630 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the ROI scalability method, a device such as a digital video camera is able to be used to acquire a video. The ROI scalability method is automatically implemented during or after acquiring a video. The ROI scalability method is able to be implemented automatically without user involvement.

In operation, the ROI scalability method is able to be implemented where scalability is used for part of a picture but not the whole picture (e.g., part of an enhancement image but not the whole enhancement image). Applications of ROI scalability include traffic monitoring, security monitoring and tiled streaming.

Some Embodiments of Region of Interest Scalability with SHVC

1. A method programmed in a non-transitory memory of a device comprising:
   a. acquiring a base layer image and an enhancement layer image; and
   b. applying a region of interest scalability implementation on part of the enhancement layer image wherein the part of the enhancement layer image is less than the full enhancement layer image.
2. The method of clause 1 wherein the region of interest scalability implementation includes signaling a region of interest map with a supplemental enhancement information message to manipulate an encoder.
3. The method of clause 2 wherein the supplemental enhancement information message indicates a location of the region of interest.
4. The method of clause 2 wherein each region of interest is one or more rectangular collections of significant coding tree units.
5. The method of clause 2 wherein the supplemental enhancement information message includes the number of regions of interest, and for each region of interest, an address of a first coding tree unit of each rectangular collection of significant coding tree units in the region of interest in scan order of the image.
6. The method of clause 5 wherein the address is encoded with differential encoding.
7. The method of clause 5 wherein the address is encoded without differential encoding.
8. The method of clause 2 wherein the supplemental enhancement information message includes information to derive the column width of the region of interest in number of coding tree units and information to derive the row height of the region of interest in number of coding tree units.
9. The method of clause 2 wherein when the supplemental enhancement information message is signaled, the encoder encodes the non-significant coding tree unit of the enhancement layer in a bitstream wherein all non-significant coding tree units of the enhancement layer are copied from a co-located base layer for signal-to-noise ratio scalability.
10. The method of clause 2 wherein when the supplemental enhancement information message is signaled, the encoder encodes the non-significant coding tree unit of the enhancement layer in a bitstream wherein all non-significant coding tree units of the enhancement layer are copied from a co-located up-sampled base layer for spatial scalability.
11. The method of clause 1 wherein the region of interest scalability implementation includes supplemental enhancement information messages to indicate that a decoder should not decode non-significant coding tree units of the enhancement layer.
12. The method of clause 1 wherein the region of interest scalability implementation uses an enhancement layer with a higher spatial resolution than the base layer for recording regions of interest in the image.
13. The method of clause 1 wherein the region of interest scalability implementation uses an enhancement layer with a frame rate different than the base layer for recording regions of interest in the image.
14. A system programmed in a non-transitory memory of a camera device comprising:
    a. a sensor configured for acquiring a base layer image and an enhancement layer image; and
    b. an applying component configured for applying a region of interest scalability implementation on part of the enhancement layer image wherein the part of the enhancement layer image is less than the full enhancement layer image.
15. The system of clause 14 wherein the region of interest scalability implementation includes signaling a region of interest map with a supplemental enhancement information message to manipulate an encoder.
16. The system of clause 15 wherein the supplemental enhancement information message indicates a location of the region of interest.
17. The system of clause 15 wherein each region of interest is one or more rectangular collections of significant coding tree units.
18. The system of clause 15 wherein the supplemental enhancement information message includes the number of regions of interest, and for each region of interest, an address of a first coding tree unit of each rectangular collection of significant coding tree units in the region of interest in scan order of the image.
19. The system of clause 18 wherein the address is encoded with differential encoding.
20. The system of clause 18 wherein the address is encoded without differential encoding.
21. The system of clause 15 wherein the supplemental enhancement information message includes information to derive the column width of the region of interest in number of coding tree units and information to derive the row height of the region of interest in number of coding tree units.
22. The system of clause 15 wherein when the supplemental enhancement information message is signaled, the encoder encodes the non-significant coding tree unit of the enhancement layer in a bitstream wherein all non-significant coding tree units of the enhancement layer are copied from a co-located base layer for signal-to-noise ratio scalability.
23. The system of clause 15 wherein when the supplemental enhancement information message is signaled, the encoder encodes the non-significant coding tree unit of the enhancement layer in a bitstream wherein all non-significant coding tree units of the enhancement layer are copied from a co-located up-sampled base layer for spatial scalability.
24. The system of clause 14 wherein the region of interest scalability implementation includes supplemental enhancement information messages to indicate that a decoder should not decode non-significant coding tree units of the enhancement layer.
25. The system of clause 14 wherein the region of interest scalability implementation uses an enhancement layer with a higher spatial resolution than the base layer for recording regions of interest in the image.
26. The system of clause 14 wherein the region of interest scalability implementation uses an enhancement layer with a frame rate different than the base layer for recording regions of interest in the image.

27. An apparatus comprising:
a. a non-transitory memory for storing an application, the application for:
 i. acquiring a base layer image and an enhancement layer image; and
 ii. applying a region of interest scalability implementation on part of the enhancement layer image wherein the part of the enhancement layer image is less than the full enhancement layer image; and
b. a processing component coupled to the memory, the processing component configured for processing the application.

28. The apparatus of clause 27 wherein the region of interest scalability implementation includes signaling a region of interest map with a supplemental enhancement information message to manipulate an encoder.

29. The apparatus of clause 28 wherein the supplemental enhancement information message indicates a location of the region of interest.

30. The apparatus of clause 28 wherein each region of interest is one or more rectangular collections of significant coding tree units.

31. The apparatus of clause 28 wherein the supplemental enhancement information message includes the number of regions of interest, and for each region of interest, an address of a first coding tree unit of each rectangular collection of significant coding tree units in the region of interest in scan order of the image.

32. The apparatus of clause 31 wherein the address is encoded with differential encoding.

33. The apparatus of clause 31 wherein the address is encoded without differential encoding.

34. The apparatus of clause 28 wherein the supplemental enhancement information message includes information to derive the column width of the region of interest in number of coding tree units and information to derive the row height of the region of interest in number of coding tree units.

35. The apparatus of clause 28 wherein when the supplemental enhancement information message is signaled, the encoder encodes the non-significant coding tree unit of the enhancement layer in a bitstream wherein all non-significant coding tree units of the enhancement layer are copied from a co-located base layer for signal-to-noise ratio scalability.

36. The apparatus of clause 28 wherein when the supplemental enhancement information message is signaled, the encoder encodes the non-significant coding tree unit of the enhancement layer in a bitstream wherein all non-significant coding tree units of the enhancement layer are copied from a co-located up-sampled base layer for spatial scalability.

37. The apparatus of clause 27 wherein the region of interest scalability implementation includes supplemental enhancement information messages to indicate that a decoder should not decode non-significant coding tree units of the enhancement layer.

38. The apparatus of clause 27 wherein the region of interest scalability implementation uses an enhancement layer with a higher spatial resolution than the base layer for recording regions of interest in the image.

39. The apparatus of clause 27 wherein the region of interest scalability implementation uses an enhancement layer with a frame rate different than the base layer for recording regions of interest in the image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An encoding method, comprising:
setting at least one identified tile and at least one non-identified tile in a picture, wherein
 the at least one identified tile comprises a first plurality of coding tree units (CTUs) that is within a first region of interest (ROI), and
 the at least one non-identified tile comprises a second plurality of CTUs; and
encoding a bitstream that has a base layer and an enhancement layer based on execution of an inter-layer prediction process between the base layer of the bitstream and the enhancement layer of the bitstream for the at least one identified tile, wherein the inter-layer prediction process is skipped for the at least one non-identified tile; and
encoding the second plurality of CTUs of the non-identified tile in the bitstream, based on copy of the second plurality of CTUs from the base layer to the enhancement layer.

2. The encoding method according to claim 1, further comprising:
setting tile position information for the at least one identified tile; and
encoding the bitstream including the tile position information.

3. The encoding method according to claim 2, wherein the tile position information indicates a first tile position of a top-left tile and a second tile position of a bottom-right tile in a tile raster scan order.

4. The encoding method according to claim 1, wherein the first ROI is a rectangular collection of the first plurality of CTUs.

5. The encoding method according to claim 2, wherein the tile position information indicates a first CTU position within the at least one identified tile in a tile raster scan order.

6. The encoding method according to claim 2, further comprising setting the tile position information as a supplemental enhancement information (SEI) parameter.

7. The encoding method according to claim 1, further comprising recording a second ROI in the picture based on a spatial resolution of the enhancement layer that is higher than a spatial resolution of the base layer.

8. The encoding method according to claim 7, wherein the recording of the second ROI is further based on a frame rate of the enhancement layer that is different from a frame rate of the base layer.

9. An encoding device, comprising:
circuitry configured to:
 set at least one identified tile and at least one non-identified tile in a picture, wherein
  the at least one identified tile comprises a first plurality of coding tree units (CTUs) that is within a first region of interest (ROI), and
  the at least one non-identified tile comprises a second plurality of CTUs; and encode a bitstream that has a base layer and an enhancement layer based on execution of an inter-layer prediction process between the base layer of the bitstream and the enhancement layer of the bitstream for the at least one identified tile, wherein the inter-layer prediction process is skipped for the at least one non-identified tile; and encode the second plurality of CTUs of the non-identified tile in the bitstream, based on copy of the second plurality of CTUs from the base layer to the enhancement layer.

10. The encoding device according to claim 9, wherein the circuitry is further configured to:

set tile position information for the at least one identified tile; and encode the bitstream including the tile position information.

11. The encoding device according to claim 10, wherein the tile position information indicates a first tile position of a top-left tile and a second tile position of a bottom-right tile in a tile raster scan order.

12. The encoding device according to claim 9, wherein the first ROI is a rectangular collection of the first plurality of CTUs.

13. The encoding device according to claim 10, wherein the tile position information indicates a first CTU position within the at least one identified tile in a tile raster scan order.

14. The encoding device according to claim 10, wherein the circuitry is further configured to set the tile position information as a supplemental enhancement information (SEI) parameter.

15. The encoding device according to claim 9, wherein the circuitry is further configured to record a second ROI in the picture based on a spatial resolution of the enhancement layer that is higher than a spatial resolution of the base layer.

16. The encoding device according to claim 15, wherein the record of the second ROI is further based on a frame rate of the enhancement layer that is different from a frame rate of the base layer.

17. A non-transitory computer-readable medium having stored thereon computer-executable instructions that, when executed by a computer, cause the computer to execute operations, the operations comprising:

setting at least one identified tile and at least one non-identified tile in a picture, wherein
the at least one identified tile comprises a first plurality of coding tree units (CTUs) that is within a first region of interest (ROI), and
the at least one non-identified tile comprises a second plurality of CTUs; and encoding a bitstream that has a base layer and an enhancement layer based on execution of an inter-layer prediction process between the base layer of the bitstream and the enhancement layer of the bitstream for the at least one identified tile, wherein the inter-layer prediction process is skipped for the at least one non-identified tile; and encoding the second plurality of CTUs of the non-identified tile in the bitstream, based on copy of the second plurality of CTUs from the base layer to the enhancement layer.

18. The non-transitory computer-readable medium according to claim 17, further comprising:

setting tile position information for the at least one identified tile; and encoding the bitstream including the tile position information.

* * * * *